United States Patent [19]

Treacy

[11] 3,765,769

[45] Oct. 16, 1973

[54] DYNAMIC SPECTROSCOPY OF PICOSECOND PULSES

[75] Inventor: Edmond B. Treacy, Vernon, Conn.

[73] Assignee: United Aircraft Corporation, East Hartford, Conn.

[22] Filed: Apr. 26, 1972

[21] Appl. No.: 247,652

[52] U.S. Cl.................. 356/79, 356/75, 356/76, 356/96, 356/99, 356/100
[51] Int. Cl. ......... G01j 3/40, G01j 3/42, G01j 3/12
[58] Field of Search ................. 356/51, 74, 75, 76, 356/77, 79, 85, 96, 97, 98, 99, 100, 101

[56] References Cited
UNITED STATES PATENTS
3,459,466   8/1969   Giordmaine .................... 356/74

OTHER PUBLICATIONS
Direct Demonstration Picosecond-Pulse Picosecond-Pulse Frequency Sweep; E.B. Treacy; Applied Phys. Letters; Vol. 17 No. 1, July 70 pg. 14–16.

"High-Speed Spectroscopy .....;" McLaren et al., Applied Phys. Letters; Vol. 16 No. 3, 1 Feb. 70; pg. 140 & 141.

Primary Examiner—David Schonberg
Assistant Examiner—V. P. McGraw
Attorney—Anthony J. Criso

[57] ABSTRACT

A device for producing a dynamic spectrogram of a picosecond pulse of electromagnetic radiation is described. A technique for recording the component wavelengths and their relative intensity as a function of time for the pulse is also discussed.

4 Claims, 4 Drawing Figures

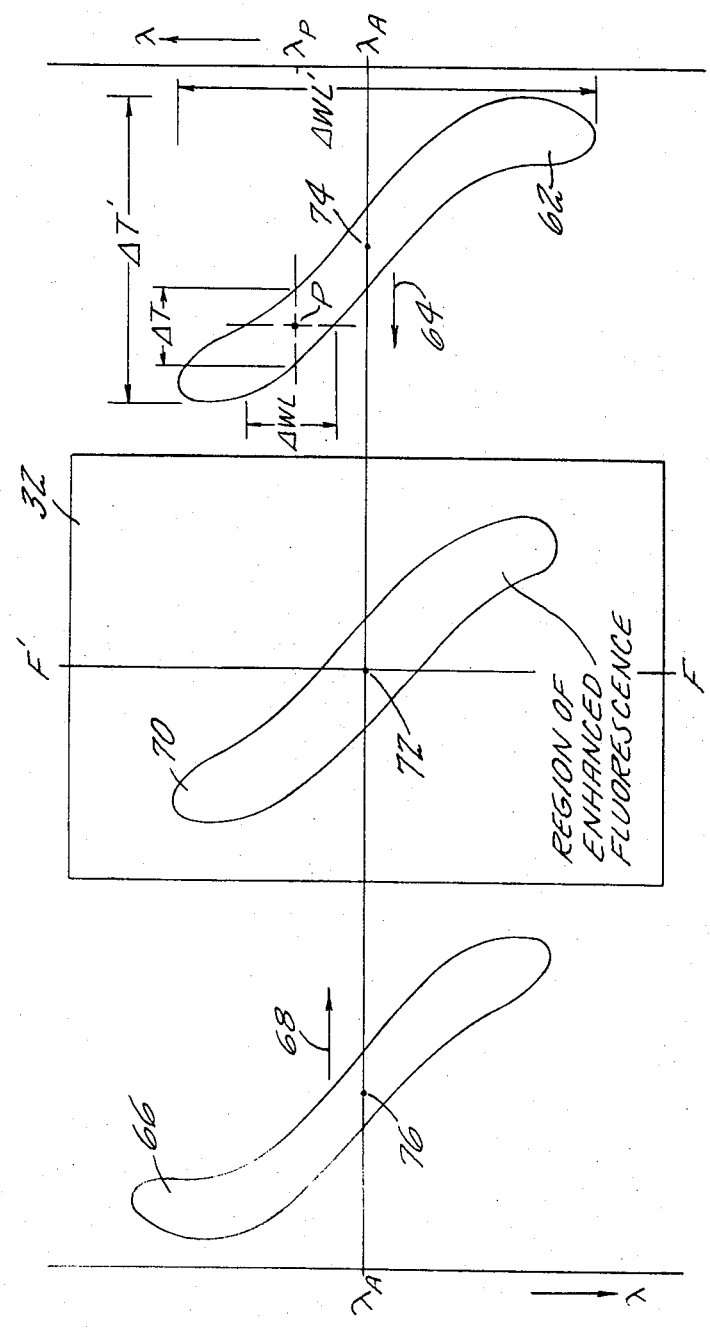

DYNAMIC SPECTROSCOPY OF PICOSECOND PULSES

BACKGROUND OF THE INVENTION

1. Field of Invention

This invention relates to the spectroscopy of ultrashort pulses and more particularly to recording the various frequencies and their relative intensities in a pulse of electromagnetic energy of picosecond duration. The invention herein described was made in the course of or under a contract or subcontract thereunder, with the Department of the Navy.

2. Description of the Prior Art

Time resolved spectroscopy is presently used in the measurement of various characteristics of bursts of electromagnetic radiation such as the afterglow effects which prevail in a gaseous medium that has been subjected to an electric discharge. The best of the available systems is suitable for measuring and recording events that occur during time intervals as short as nonoseconds in duration. Such equipment is suitable for many of nanoseconds short pulse investigations being conducted. Further, since the phenomena being studied are generally changing at rates which are slower than the characteristic time response of the equipment, there is no incentive to improve the speed of the equipment. There is, however, a large and growingly important class of ultrashort pulses having characteristic duration times in the picosecond range for which a useful spectrogram cannot be produced with the conventional system. The time response of the equipment currently available for picosecond pulse investigation is greater than the time scale of the events in the pulse being observed and the detail of the event is consequently obliterated. Therefore, the availability of equipment and methods having a response time which is nanosecond than the nonosecond technology and suitable for recording picosecond events would be a very useful contribution to the ultrashort pulse technology.

SUMMARY OF THE INVENTION

An object of the present invention is to separate the various frequency components of an ultrashort pulse of electromagnetic radiation about a point in space in order to establish the wavelength and intensity composition of the pulse as a function of time.

According to the present invention a grating spectrometer is modified to permit the formation of a spectrogram of an ultrashort pulse of electromagnetic radiation in which the wavelength and intensity of the component frequencies constituting the pulse are recorded as a function of time. According further to the present invention, a stepped mirror having individual facets which are sufficiently small that the duration of that part of a component pulse which is reflected by an individual facet is shorter than the duration of the full pulse, is incorporated into a grating spectrometer to produce a pulse in which the component wavelengths are segregated; this pulse is then passed through a focusing lens and the individual component wavelengths appear at the focal plane of the lens at discrete locations.

At the present stage of the development in the art, this apparatus is the only known device for measuring the time varying structure of a very short pulse of electromagnetic radiation. A feature of the present invention is that the spectrometer possesses a high angular dispersion and low resolving power. Another feature of the present invention is that the resolving power of a potentially highly dispersive spectrometer is degraded to allow a very fast time response; the spectrometer achieves the minimum uncertainty between frequency and time, i.e., the product of the time and frequency uncertainties is the minimum theoretical value. The invention is further characterized by the stepped mirror which does not need to be made with any great precision that allows the use of a grating of sufficient dimensions that the full input beam can be utilized while the response time of the whole system is kept shorter than the response time of the grating.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

FIG. 4 is a schematic plan view of a dye cell centered about the focal plane of the spectrometer shown in FIG. 1 wherein the light packet having the intensity distribution relative to time and frequency characteristic of the pulse being measured is made to intersect against its inverted image in order to display the rate of change of wavelength with time at a particular wavelength point in the pulse.

DESCRIPTION OF THE PREFERRED EMBODIMENT

Figure 1:
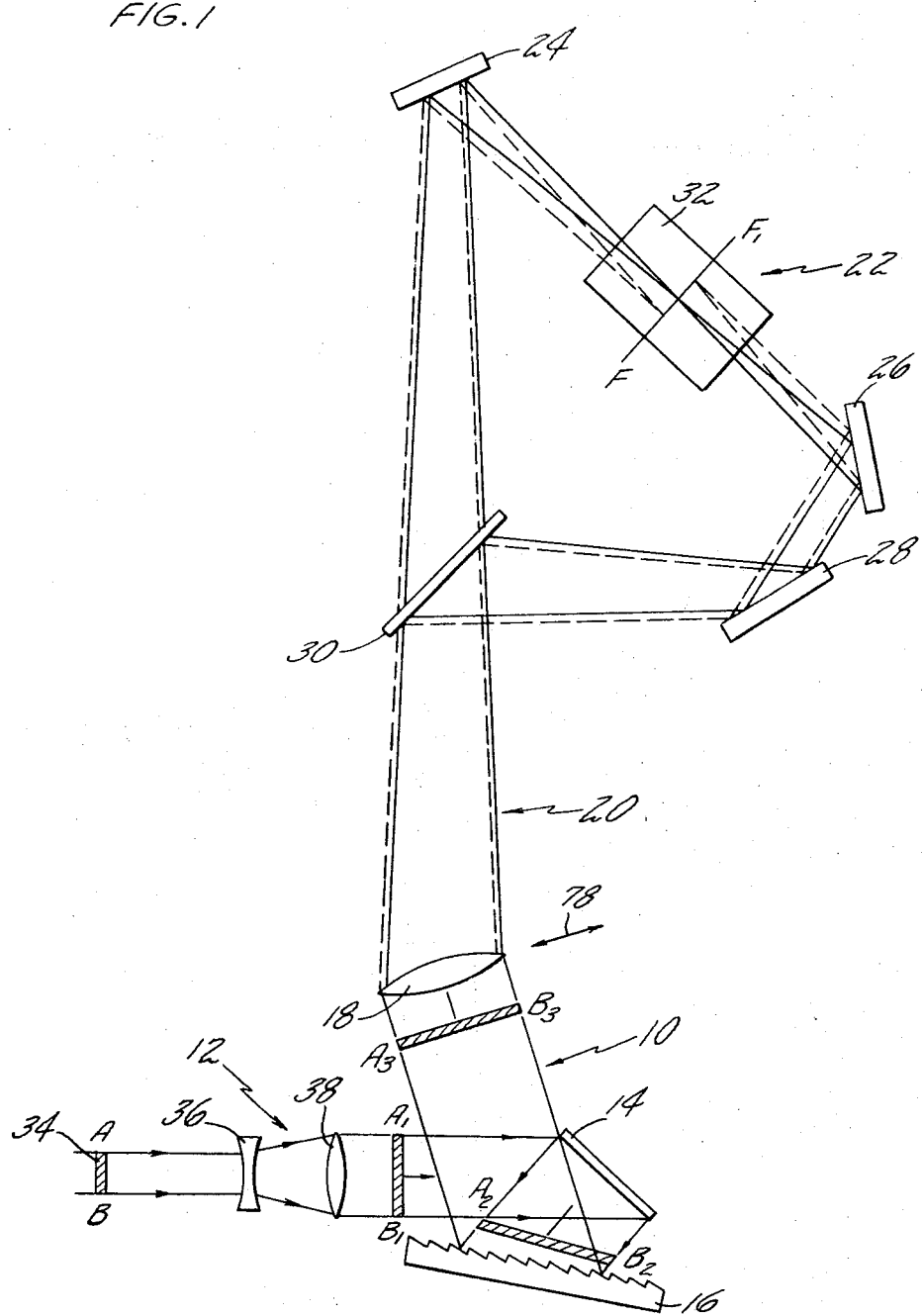
FIG. 1 is a schematic plan view of a spectrometer and a pulse coincidence measuring system in accordance with the present invention.

This disclosure reveals suitable equipment and techniques for producing dynamic spectrograms of ultrashort pulses and the typical wavelength and intensity information which is available in such a pulse. With the embodiment shown in the drawing, a pulse of optical wavelength radiation is separated into various frequency components that appear as a continuously distorting wave packet. Each wavelength component of the packet is focused at a point in space and the arrival time of each of these components is measured and recorded. The locations of the various focal points are a function of frequency and they lie on a line in the focal plane. The shape of the wave packet undergoes negligible distortion over a range of a couple of centimeters on each side of the focal plane so that the intensity distribution in the packet as it appears in the region of the focal plane is essentially the time-frequency-intensity distribution characteristic of the dynamic spectrogram. A dye cell is positioned about the focal plane and when the frequency components of the original pulse arrive at the focal plane, the fluorescence of the dye is enhanced where the wave packets coming from opposite directions overlap, forming a visible image which is photographed to show the slope of the spectrogram.

A typical apparatus used in practicing this invention is shown in FIG. 1. A grating spectrometer 10 which is comprised of a telescope 12, a diffraction grating 14, a stepped mirror 16 and a focusing lens 18 provides a composite beam 20 which is fed into a recording system 22. The recording system is made up of fully reflecting mirrors 24-28, a beam splitter 30, a dye cell 32 and a camera, not shown in the figure, looking down at the dye cell.

The spectrometer shown in FIG. 1 is characteristically a high angular dispersion instrument having a low resolving power. The diffraction grating has a very small grating constant and since the resolving power is equal to the number of grating rulings intercepted by an incident beam, a high power of resolution would normally result. However, by introducing the stepped mirror into the spectrometer so that each step images only a limited number of the grating rulings illuminated by the incident beam, the resolving power of the spectrometer is reduced. Another effect essential to the present invention which is also brought about by the stepped mirror is the rapid response time of the spectrometer. The response time of a system is equal to the resolving power divided by the frequency of the radiation involved. Therefore, it follows the response time of the spectrometer is decreased in direct proportion to the decrease in resolving power. It also follows that by trading off time resolution and resolving power the spectrometer can respond in a time that is less than the duration of a pulse of radiation which is passed through the spectrometer while still resolving the frequency spectrum.

In operation, a pulse 34 of electromagnetic radiation having a duration in the picosecond range and comprised of various frequency components enters the telescope system 12. An expander lens 36 and a collimating lens 38 modify the pulse so that when it is in position $A_1B_1$, the radiation is collimated and reduced in energy density to a level below the damage threshold of the surface of the diffraction grating 14. When the collimated radiation intercepts the grating surface, the various wavelength components of the radiation are dispersed into different directions as will be discussed below in greater detail. Although each of the component frequencies of the pulse whose wavefront is perpendicular to its direction of travel is redirected into a different direction by the action of the grating, all of the energy contained in the pulse as it approaches the grating is propagated in a single pulse as a continuously distorting wave such as the wave shown at position $A_2B_2$. The pulse is then reflected by the stepped mirror 16 in a process which will be described more fully below, and at position $A_3B_3$ the pulse is moving as a plane slab which again is essentially perpendicular to the direction of travel. Since the diffraction grating disperses the pulse 34 thereby forming a plurality of beams each of which is comprised of a characteristic frequency component contained in the pulse, and since each beam proceeds in a different direction, the stepped mirror effectively reflects a plurality of individual beams with each beam having a characteristic wavelength and approaching the lens 18 from a different angle; all such beams travel simultaneously and appear to be one wave packet as is shown in position $A_3B_3$. Since each component wavelength of the pulse 34 approaches the focusing lens from a slightly different direction, each beam or wavelength is focused at a different point in the focal plane $FF_1$ of the lens 18. The beam splitter 30 which is positioned between the lens 18 and its focal plane intercepts the composite beam 20. Each of the individual beams in the composite beam falls onto the beam splitter and is directed through the recording system as is shown in FIG. 1. The clockwise and counterclockwise paths between the beam splitter and the focal plane of the lens 18 are equal in length, however, these paths differ by one mirror reflection so that the angular dispersions of each path are equal and opposite in the intersection region about the focal plane.

Figure 2:
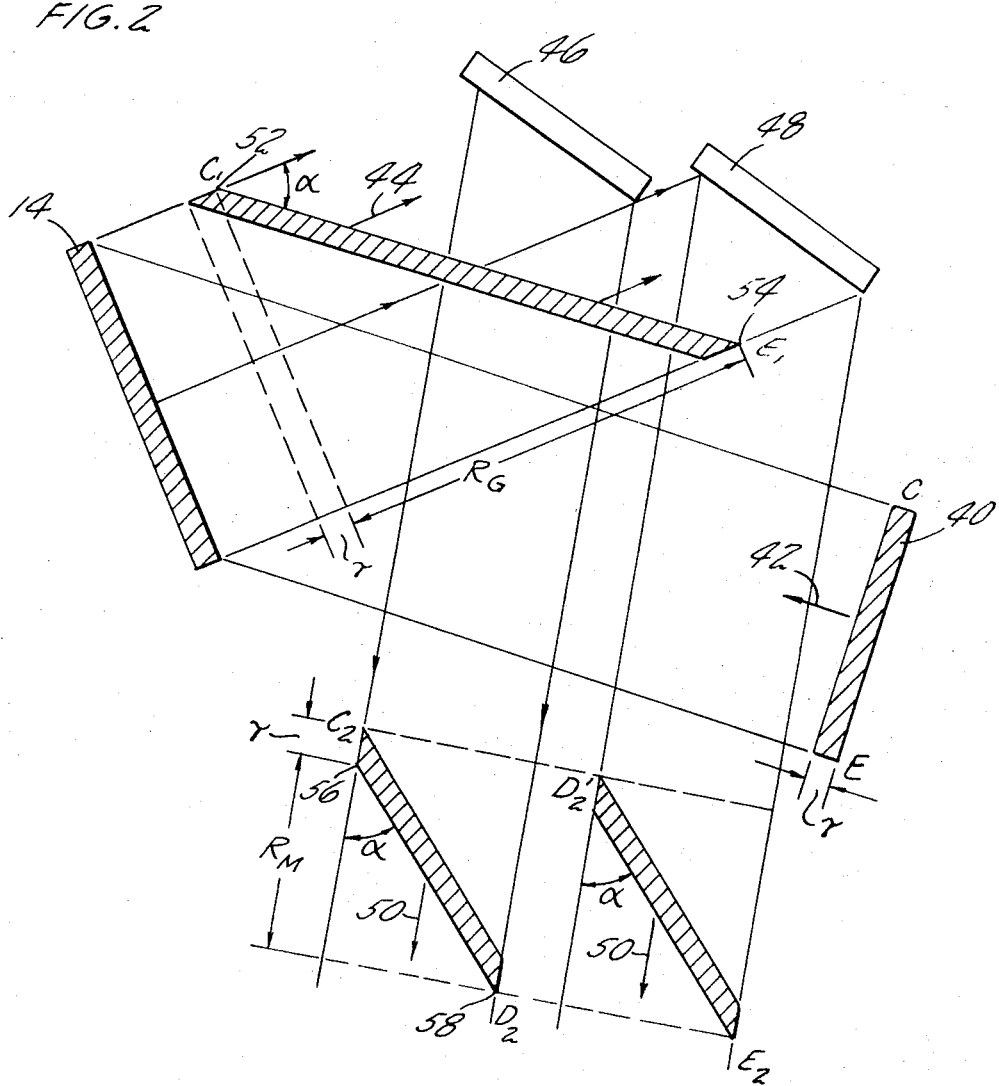
FIG. 2 is a schematic diagram of the interaction between a collimated, narrow band pulse and a diffraction grating which causes a distorted wave, and the effect on the duration thereof caused by a plurality of mirrors.
Figure 3:
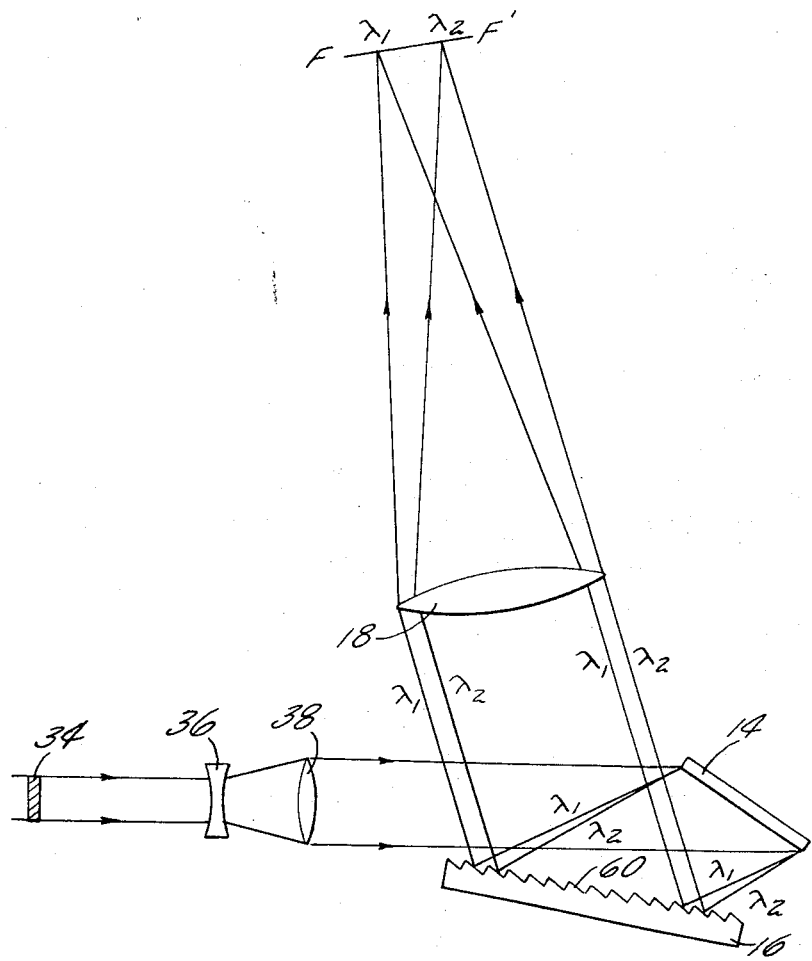
FIG. 3 is a schematic plan view of the ray paths through a spectrometer in accordance with the present invention for a pulse of collimated radiation containing several wavelengths.

The combined effect of a diffraction grating and a stepped mirror in a spectrometer which has a time response that is faster than the duration of the input pulse is described with reference to primarily FIGS. 2 and 3. In FIG. 2 the pulse 40 of duration $\tau$ at position CE travels in a direction 42, strikes the diffraction grating 14 and is reflected as a diffracted pulse traveling in a direction 44. Since all parts of the pulse 40 do not reach the grating at the same time, the diffracted pulse is continuous but its duration is increased by an amount $R_G$, the response time of the grating as is shown in position $C_1E_1$. The relationship between the duration of the pulse in position CE and in position $C_1E_1$ is a function of the angle of incidence and the scattering angle of the diffraction grating. If a pair of mirrors 46, 48 is positioned in the path of the pulse $C_1E_1$ as is shown in FIG. 2 each of the mirrors intercepts a portion of the pulse $C_1E_1$ thereby splitting the pulse into two individual pulses $C_2D_2$ and $D'_2E_2$, that travel in a direction 50. The duration of each of the latter pulses is greater than $\tau$ by one half $R_G$. It should be apparent also that by increasing the number of mirror elements, the pulse $C_1E_1$ can be split into a corresponding number of individual pulses in which the time duration of a single wavelength component in these reflected pulses is less than the duration of the pulse in position CE. The response time $R_G$ of the grating shown in FIG. 2 is the time difference between points 52 and 54 on the pulse in position $C_1E_1$. After the pulse is reflected from the mirrors 46, 48 and thereby split as shown, the response time $R_M$ becomes the time difference between points 56 and 58 on the pulse in position $C_2D_2$ and $R_M$ 32 1/2 $R_G$. If the pulse were split by more than two mirrors as was just described, the time difference between the points corresponding to the points 56, 58 and referred to as the response time of the system, can be made small in comparison to the duration, $\tau$, of the pulse in position CE.

The ray diagram shown in FIG. 2 presumes that the pulse 40 is comprised of radiation at only one wavelength. In a practical system the present invention is practiced with radiation pulses that are comprised of many wavelengths and two representative wavelength paths are shown in FIG. 3. Since a diffraction grating will redirect each wavelength in a collimated beam of radiation incident thereon in a different direction, the grating 14 causes each component frequency in the pulse which strikes the grating to go off in a characteristic direction. A plurality of individual beams, each of which is comprised of a single frequency is directed toward the mirror 16 as a single wave packet such as that shown in FIG. 1 at position $A_2B_2$. Each of these beams is incident on the mirror at an angle which is determined by its wavelength. The stepped mirror is actually a plurality of parallel reflecting facets 60 and the various individual wavelength beams which are incident on the mirror are reflected toward the lens 18 as a plurality of frequency-dependent beams of very short duration. The duration of each of these beams is dependent upon the actual dimensions of each of the facets forming the reflecting surface, and the direction each beam takes while proceeding toward the focusing lens is dependent upon the angle of incidence between the beam and the mirror. The lens focuses each wavelength at a different position in its focal plane as is shown in FIG. 3 because each wavelength approaches the focusing lens as a single wavelength, collimated pulse at a characteristic angle.

A graphic distribution of intensity relative to both time and frequency for typical pulse is shown in FIG. 4. A wave packet, 62, which moves in a direction 64 and its inverted image 66 which moves in a direction 68 are formed with the beam splitter mirror combination 24-30 shown in FIG. 1; the ordinate and the abscissa represent frequency and time respectively. When the wave packet 62, and its image 66 intersect in the dye cell 32, a region 70 of enhanced fluorescence is produced by two photon absorption processes, and a photograph is made of the region 70. An exemplary system suitable for laser pulses from a neodymium glass laser is a solution of rhodimine 6G in dichloroethane. The slope of the fluorescent region at a randomly selected point 72 is identical to the slope of the images 62, 66 at points 74, 76 respectively, both these points are at the same wavelength $\lambda_A$. The wavelength component of each of the images 62, 66 which is self intersecting, as just described, can be easily changed by moving the lens 18, as shown in FIG. 1, in a direction 78 which is perpendicular to the direction of pulse travel thereby permitting successive slope measurements throughout the region 70. Thus, the complete spectrogram of a pulse can be reconstructed by making a sequence of measurements using different values for $\lambda_A$ on a series of identical pulses. If only one measurement is made using this technique, information such as whether the pulse has simple structure, as contrasted to the structure of a noise burst, or a frequency sweep is immediately determinable. In the event the pulse has a frequency sweep, the measurement provides the sweep rate.

A further explanation regarding the shortening of the response time of the spectrometer can be provided with reference to FIG. 4. A very desirable form of spectrogram can be produced when the pulse 62 has a total pulse width $\Delta T'$ that is very large compared to the minimum width of the pulse at a given point P such as $\Delta T$ measured at $\lambda_P$, and simultaneously the total wavelength spread in the pulse $\Delta WL'$ is large compared to the minimum wavelength spread $\Delta WL$ about the point P in the pulse.

The discussion above describes a preferred method for determining the intensity-time-frequency distribution of a pulse; however, any technique for determining this distribution is suitable for use with this invention. Further explanation and a detailed theoretical treatment of various aspects of this invention can be found in the publication entitled "Measurement and Interpretation of Dynamic Spectrograms of Picosecond Light Pulses", Journal of Applied Physics, Vol. 42, No. 10, Sept. 1971, pages 3848-3858 by E. B. Treacy.

Although this invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for producing a spectrogram of an picosecond pulse of collimated electromagnetic radiation comprising:
    means for dispersing the ultrashort pulse into a plurality of component pulses each of which has a characteristic wavelength and travels in a direction determined by the wavelength,
    means for reducing the duration of the component pulses to a value which is less than the duration of the picosecond pulse;
    means for focusing the component pulses; and
    means for recording the relative arrival of each component pulse with respect to a reference plane.

2. The invention according to claim 1 wherein the means for dispersing the picosecond pulse is a diffraction grating.

3. The invention according to claim 1 wherein the means for reducing the duration of the individual pulses is a stepped mirror.

4. A method of producing a spectrogram of an picosecond pulse of collimated electromagnetic radiation including the steps of:
    dispersing the picosecond pulse into a plurality of component pulses each of which has a characteristic wavelength and travels in a direction determined by the wavelength;
    reducing the duration of the component pulses to a value which is less than the duration of the picosecond pulse;
    focusing the component pulses; and
    recording the relative arrival of each component pulse with respect to a reference plane.

* * * * *

UNITED STATES PATENT OFFICE
CERTIFICATE OF CORRECTION

Patent No. 3,765,769       Dated October 16, 1973

Inventor(s) EDMOND B. TREACY

It is certified that error appears in the above-identified patent and that said Letters Patent are hereby corrected as shown below:

| | |
|---|---|
| Column 1, lines 20 and 21, | "nonoseconds" should read -- nanoseconds -- |
| line 22, | delete "nanoseconds" and insert -- the -- |
| line 36, | delete "nanoseconds" and insert -- less -- |
| line 37, | "nonosecond" should read -- nanosecond -- |
| Column 4, line 44 | "$R_M$ 32 1/2 $R_G$" should read -- $R_M = 1/2\ R_G$ -- |

Signed and sealed this 12th day of March 1974.

(SEAL)
Attest:

EDWARD M. FLETCHER, JR.
Attesting Officer

C. MARSHALL DANN
Commissioner of Patents